United States Patent [19]

Ishikawa

[11] Patent Number: 5,171,058
[45] Date of Patent: Dec. 15, 1992

[54] COLLISION ENERGY ABSORBING STRUCTURE FOR A VEHICLE SIDE BODY

[75] Inventor: Toshihiro Ishikawa, Hiroshima, Japan

[73] Assignee: Mazda Motor Corporation, Hiroshima, Japan

[21] Appl. No.: 789,434

[22] Filed: Nov. 6, 1991

Related U.S. Application Data

[63] Continuation of Ser. No. 546,309, Jul. 2, 1990, abandoned.

[30] Foreign Application Priority Data

Jun. 30, 1989 [JP] Japan .................... 1-77728[U]

[51] Int. Cl.$^5$ ............................................. B60R 27/00
[52] U.S. Cl. .................... 296/189; 296/146 D; 296/146 F
[58] Field of Search .................... 296/189, 188, 146; 49/502

[56] References Cited

U.S. PATENT DOCUMENTS

| | | | |
|---|---|---|---|
| 3,829,149 | 8/1974 | Stevens | 296/189 |
| 4,378,395 | 3/1983 | Asoshina et al. | 296/189 X |
| 4,411,466 | 10/1983 | Koike | 296/188 |
| 4,451,518 | 5/1984 | Miura et al. | 296/189 X |
| 4,702,515 | 10/1987 | Kato et al. | 296/189 |
| 4,901,500 | 2/1990 | Wycech | 296/189 X |
| 5,026,111 | 6/1991 | Hewko | 296/146 |
| 5,040,335 | 8/1991 | Grimes | 296/189 X |
| 5,056,861 | 10/1991 | Garnweidner et al. | 296/188 |

FOREIGN PATENT DOCUMENTS

| | | | |
|---|---|---|---|
| 267895 | 5/1988 | European Pat. Off. | 296/189 |
| 61-171620 | 10/1986 | Japan . | |
| 1626 | 1/1987 | Japan | 296/188 |
| 64-40720 | 3/1989 | Japan . | |

Primary Examiner—Margaret A. Focarino
Assistant Examiner—Joseph D. Pape
Attorney, Agent, or Firm—Fish & Richardson

[57] ABSTRACT

A side body collision energy absorbing structure which has a closed cross-section configuration member formed by a belt line reinforcement or a door panel and a stiffness reduced portion formed at least on the belt line reinforcement or the door panel so that a portion of the closed cross-section member facing toward a passenger in a direction transverse to the vehicle has relatively lower stiffness compared with the remaining portion. By providing such a reduced stiffness portion, the shock acting on passengers can be effectively moderated. Furthermore, the stiffness reduced portion may be concealed in a side door by a trim which does not protrude toward the passenger compartment of the vehicle when the stiffness reduced portion is formed by a bead at least on the belt line reinforcement or the door panel.

19 Claims, 7 Drawing Sheets

COLLISION ENERGY ABSORBING STRUCTURE FOR A VEHICLE SIDE BODY

This application is a continuation of U.S. application Ser. No. 07/546,309, filed Jul. 2, 1990, now abandoned.

BACKGROUND OF THE INVENTION

1. Field of the Invention

The present invention relates to a collision energy absorbing structure which is provided on the side portion of a vehicle such as an automotive passenger car, particularly to a side body energy absorbing structure being capable of moderating the shock acting on a passenger at the time of collision.

2. Description of the Prior Art

Previously, in order to protect the passenger in side collision, side body energy absorbing structures have been proposed. For example, a side body energy absorbing structure such that a protruding buffer portion is provided on the door inner panel at the portion corresponding to the seated passenger's chest and legs has been introduced so that it can prevent the passenger from being seriously damaged in the event of a collision.

In addition, Laid-open Japanese Utility Model Application 61-171620 discloses a side body energy absorbing structure which includes a reinforcement element provided on the reverse side of the protruding buffer portion in order to increase the buffer effect in the event of the collision by firmly maintaining the configuration of the protruding buffet portion.

Furthermore, in hard top cars, a belt-like zone corresponding to the inside upper edge portion of the side door, called a belt line, is known to be reinforced by the reinforcement element to increase the stiffness of the side door.

It is desirable to prevent serious injury to the passenger at the time of a side collision due to the strengthened belt of the conventional side body energy absorbing structure described above.

SUMMARY OF THE INVENTION

In view of the above circumstances, the present invention has the purpose of providing the side collision energy absorbing structure to maintain the stiffness of the main part of the door while having the ability to effectively decrease the shock to a passenger in a side collision.

This purpose is accomplished by providing a side body collision energy absorbing structure which comprises a closed cross-section member formed by a belt line reinforcement and a door panel and a stiffness reduced portion formed at least on the belt line reinforcement or the door panel so that a portion corresponding to a passenger along the width of the vehicle has relatively lower stiffness compared with the remaining portion.

By providing such a stiffness reduced portion, the shock acting on passengers can be effectively moderated. Furthermore, the stiffness reduced portion may be concealed in a side door by a trim without protruding toward a passenger compartment room in the case that the stiffness reduced portion is formed with the bead at least on the belt line reinforcement or the door panel.

In accordance with the present invention, since the stiffness reduced portion is provided on the closed cross-section member comprising the belt line reinforcement or the door panel so that the stiffness reduced portion corresponds to passenger's body in the vehicle transverse direction, the shock felt by a passenger in a side collision can be greatly reduced without sacrificing the good looks of the interior and while retaining the feeling of a roomy compartment space without any discomfort.

The above and other objects and features of the present invention will become apparent from the following description of a preferred embodiment with reference to the accompanying drawings.

DETAILED DESCRIPTION

Figure 1A:
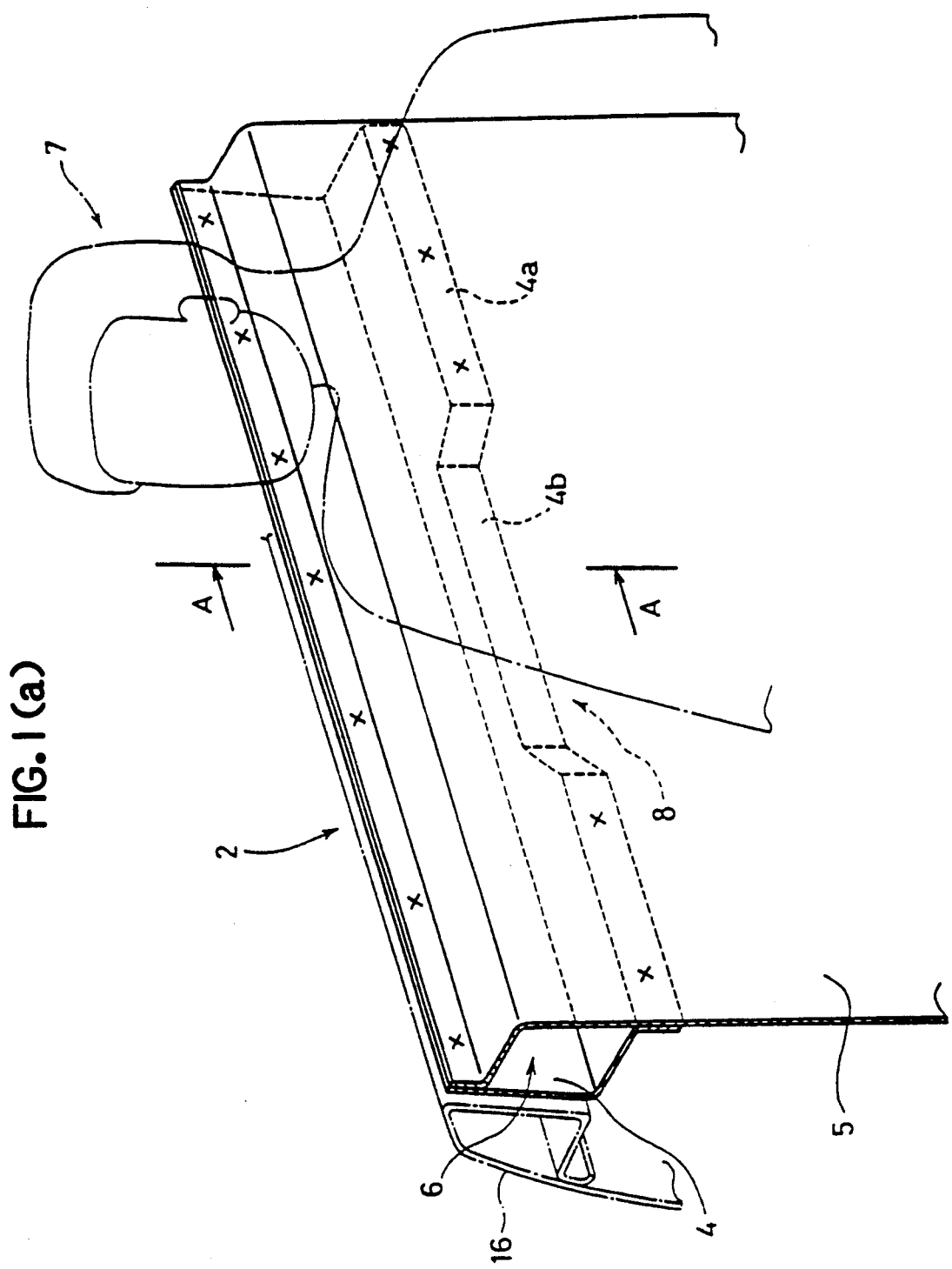
FIG. 1(a) is a perspective view showing main portions of a side body energy absorbing structure in accordance with one embodiment of the invention.
Figure 5:
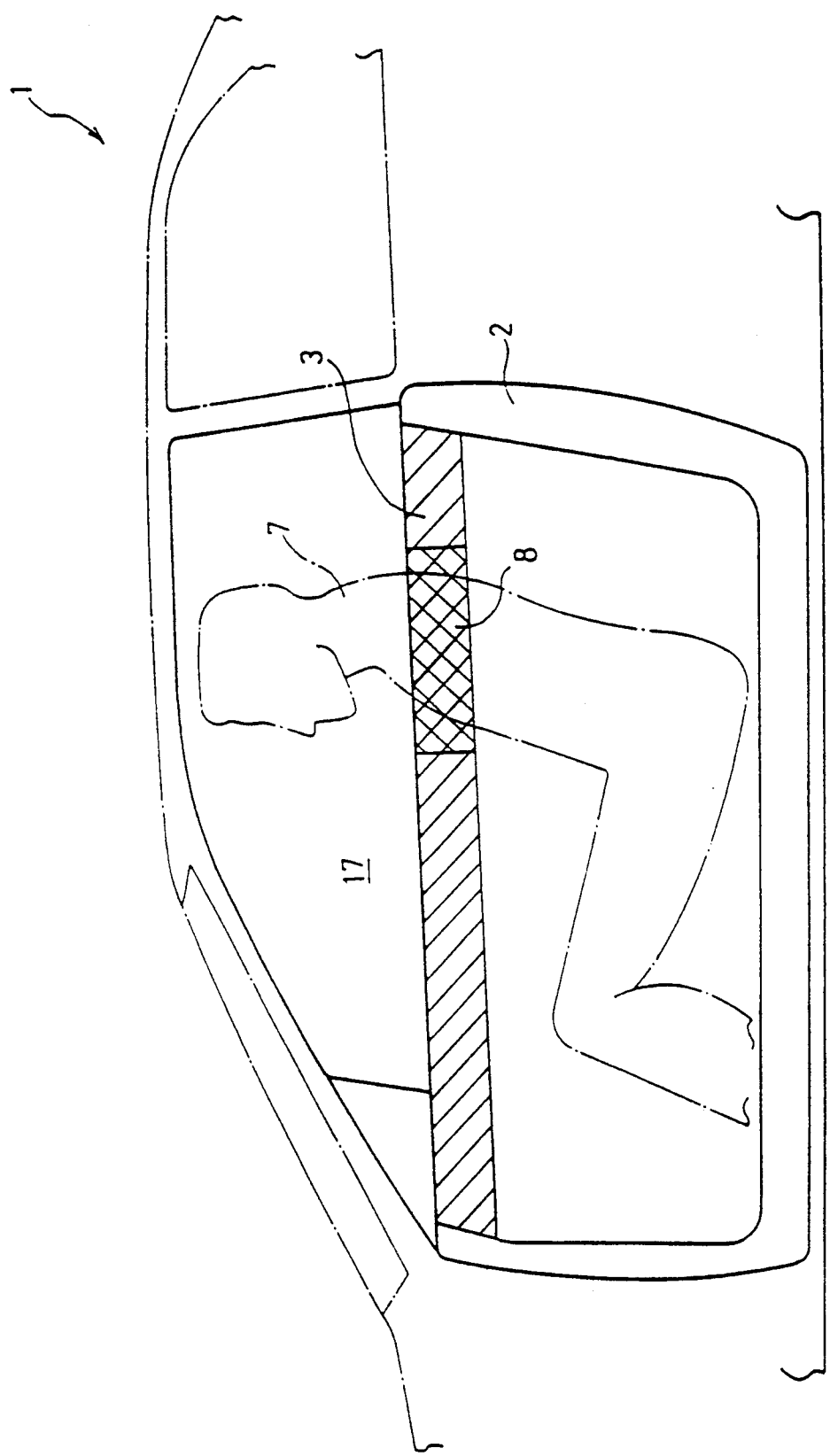
FIG. 5 is a side view of a side door.

Referring to FIG. 5, a belt line 3 (shown as hatched in FIG. 5) is provided at an upper edge portion of a side door 2 of a hard top car 1. The belt line 3 is formed of a closed cross-section member 6 consisting of a belt line reinforcement 4 and a door inner panel 5 so as to have a high stiffness, as shown in FIG. 1(a). In a portion of the closed cross-section member 6 corresponding to the side of a passenger 7 (cross-hatched portion in FIG. 5) is formed a stiffness reduced portion 8 in order to reduce the stiffness of the closed cross-section member 6 so that the shock acting on the passenger 7 can be effectively moderated in an event of a side collision.

Figure 1B:
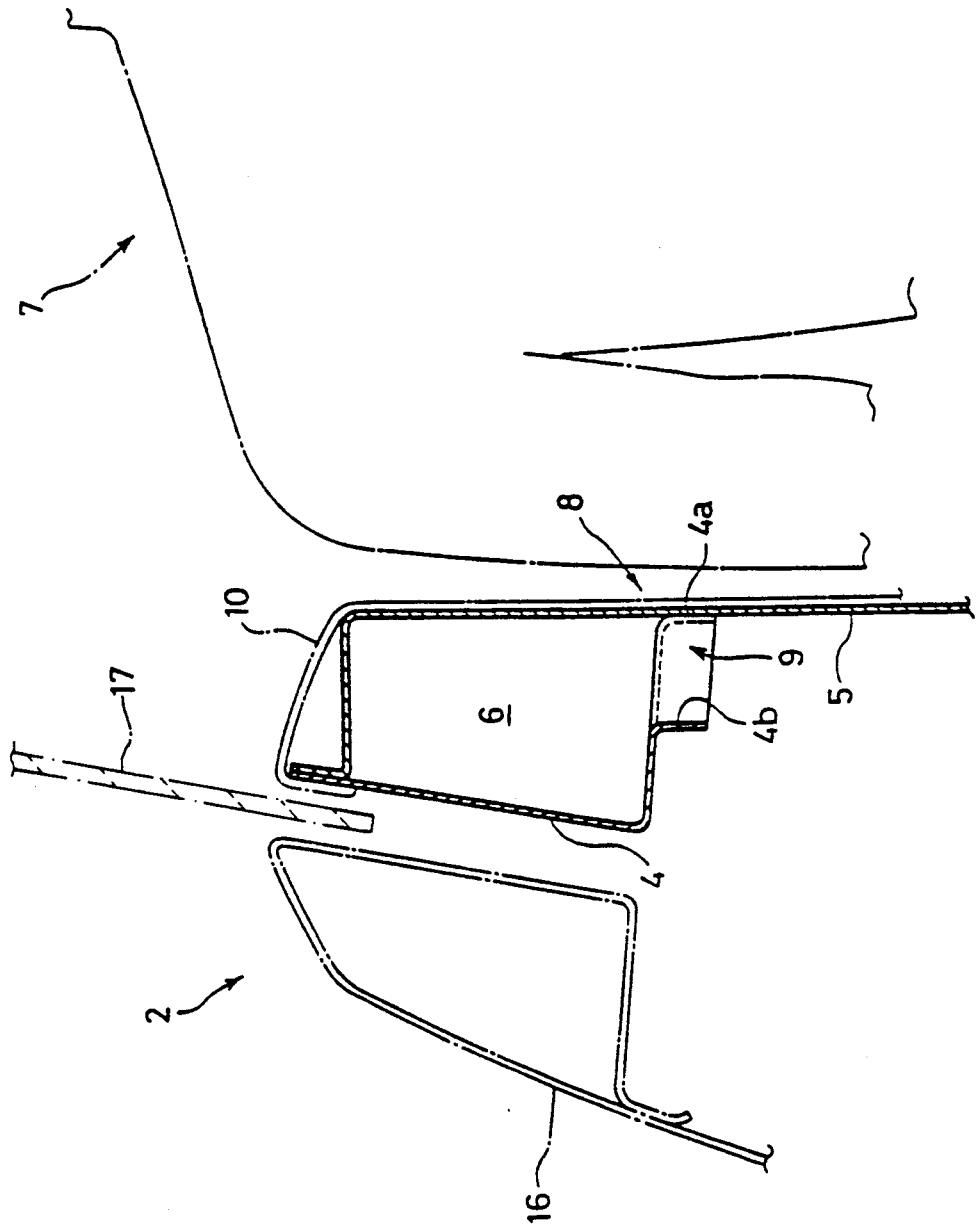
FIG. 1(b) is a cross-sectional view taken along a line A—A of FIG. 1(a)

As shown in FIG. 1(a), the stiffness reduced portion 8 is formed on the belt line reinforcement 4 which is connected to the door inner panel 5 at the upper edge thereof by welding. The belt line reinforcement 4 has an L-shaped cross-section. An upper edge of the belt line reinforcement 4 is welded to the upper flange of the door inner panel 5, and connecting flange 4a of the belt line reinforcement 4 is welded to a vertical base part of the door inner panel 5. The connecting flange 4a forms a concave portion 4b. As shown in FIG. 1(b), when the belt line reinforcement 4 is connected with the door inner panel 5, the concave portion 4b is spaced from the door inner panel 5 by a relatively large gap 9. Namely, since the stiffness which is necessary to absorb the energy in a side collision is mainly provided by a door outer panel 16, the stiffness reduced portion 8 as described above can be formed on the door inner panel 5 at the portion which hits the passenger 7 in the event of side collision so as to reduce the shock of the passenger 7 by partly lowering the rigidity thereof. Number 17 in FIG. 1(b) denotes side-window glass.

By such an arrangement, in the case of a side collision, the stiffness reduced portion 8 hits directly on the passenger's shoulder. That results in reducing the passenger's damage. Furthermore, because of being formed on the belt line reinforcement 4, the stiffness reduced portion 8 can be prevented from protruding toward compartment room. Accordingly, the inside surface of the door inner panel 5 can be covered with first door trim 10 like a conventional door. In other words, the stiffness reduced portion 8 does not affect the door trim 10. (See FIG. 1(b)). Therefore, the aesthetic appearance of the interior is not sacrificed and the interior space can be kept roomy enough without any discomfort.

Figure 2A:
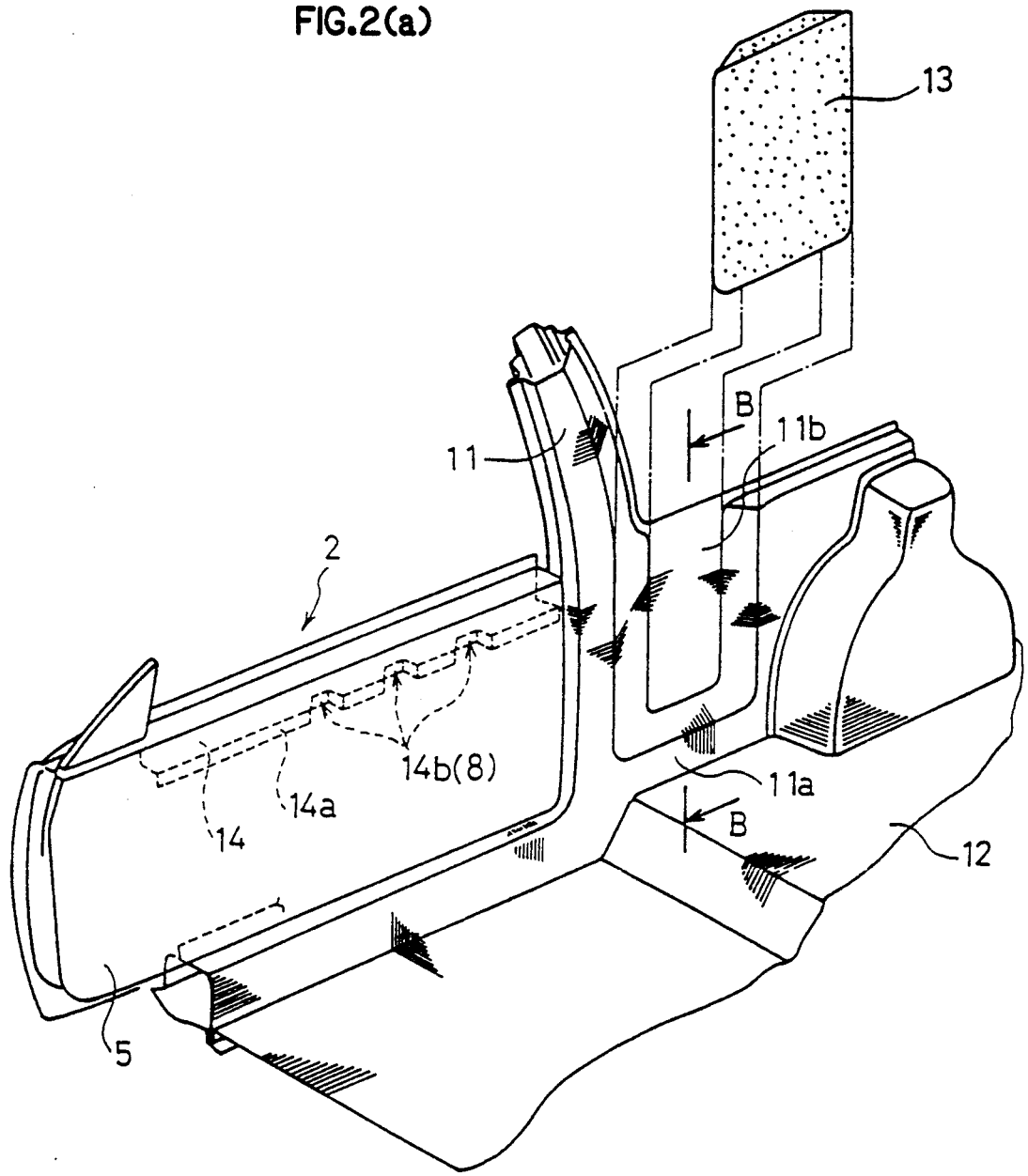
FIG. 2(a) is a perspective inside view of a passenger compartment room which is provided with the side body energy absorbing structure.
Figure 2B:
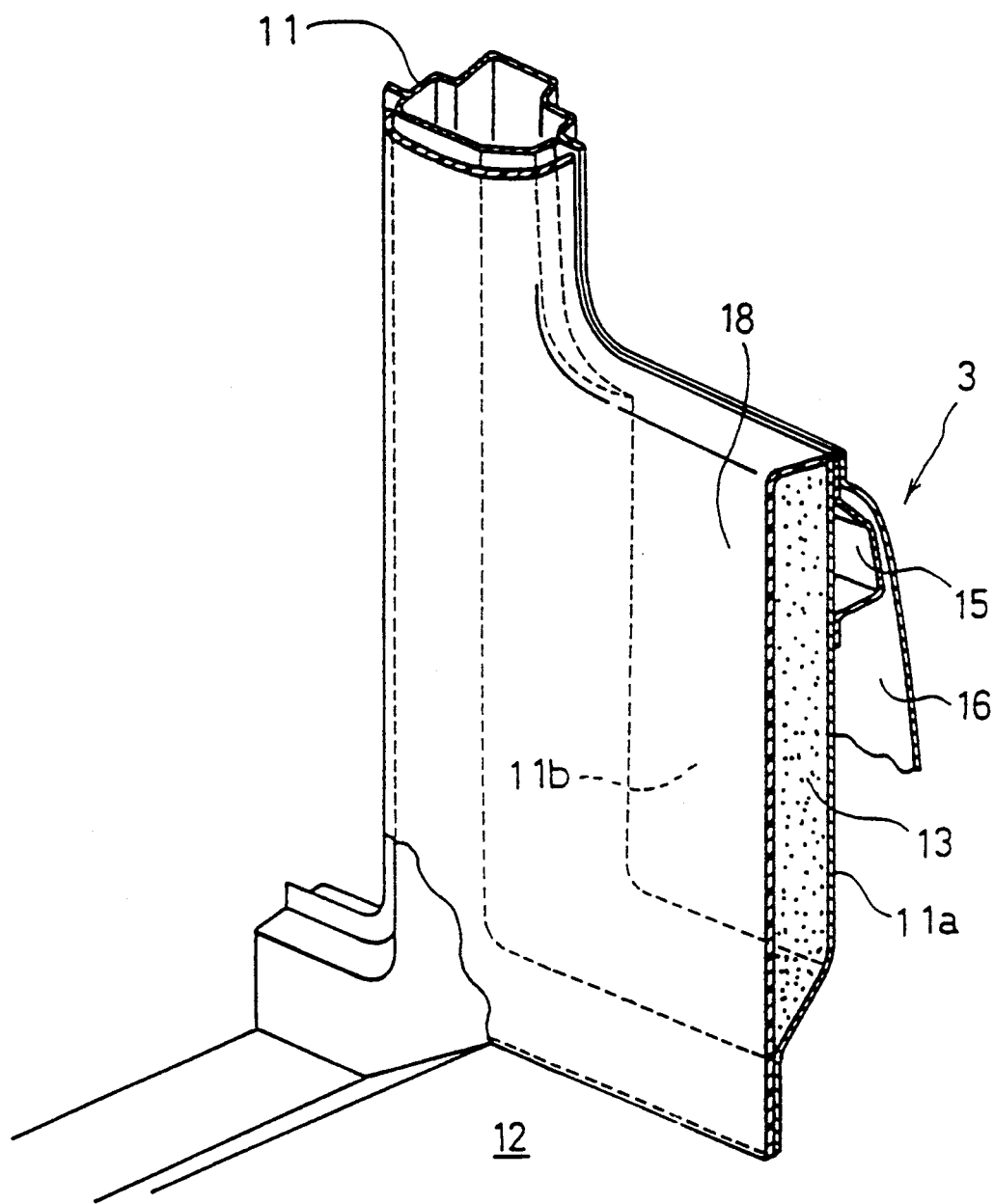
FIG. 2(b) is a partial cross-sectional view taken along a line B—B of FIG. 2(a)

Referring to FIG. 2(a), the side door 2 has a belt line reinforcement 14 having a connecting flange 14a. The connecting flange 14a is provided with a plurality of the stiffness reduced portions 8, which detailed structure are the same as the first embodiment. Accordingly, the stiffness reduced portions 8 do not protrude toward the passenger compartment room, and the door inner panel can be covered with flat trim. In this embodiment, on an inner panel 11a, a rectangular concave portion 11b is formed along a vertical center pillar 11 and a horizontal floor panel 12. The rectangular concave portion 11b is surrounded by a U-shaped raised portion. An energy absorber 13 is fitted to the inside surface of the rectangular concave portion 11b to reduce the stiffness of the inner panel 11a. As shown in FIG. 2(b), a reinforcement member 15 is provided on the outside of the inner panel 11a to reinforce the belt line 3. In FIG. 2(b), numeral 18 denotes a trim covering the inside surface of the inner panel 11a.

In accordance with such an arrangement, the lower portion of the center pillar 11 cannot only increase its bending stiffness for the cross-section-like configuration member but also effectively decrease the stiffness of the inner panel 11a at the portion which corresponds to the side of the passenger who is seated on a rear seat (not shown) by providing the energy absorber 13. Furthermore, since the rectangular concave portion 11b is recessed toward outside, it does not protrude into the compartment room. Therefore, the inside surface of the inner panel can be covered with flat trim. Also, the aesthetic appearance of the interior is not sacrificed and the interior space can be kept roomy enough without any discomfort.

Figure 3B:
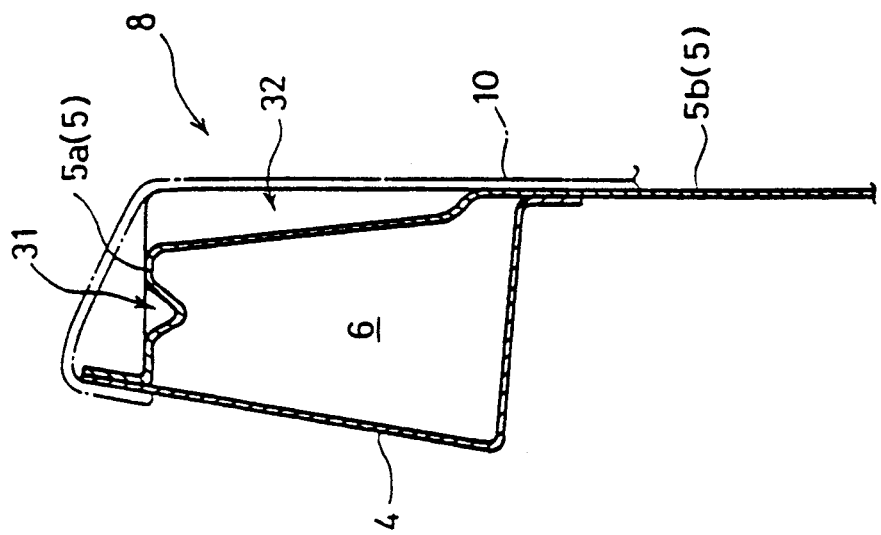
FIG. 3(b) is a cross-sectional view taken along a line C—C of FIG. 3(a)
Figure 3A:
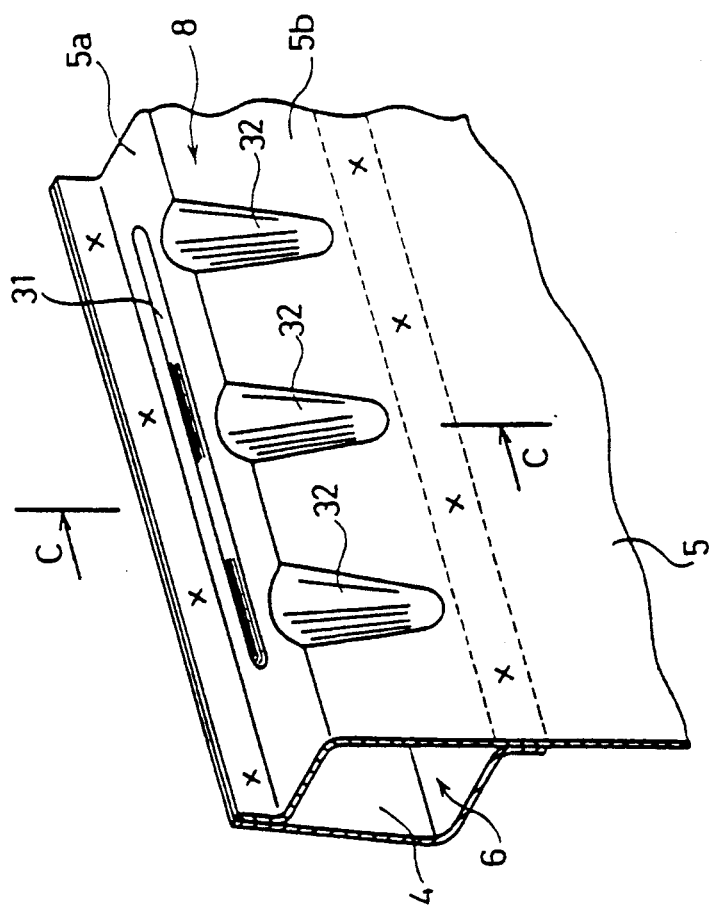
FIG. 3(a) is a perspective view showing main portions of a side body energy absorbing structure in accordance with another embodiment of the present invention.

Referring to FIG. 3(a), as well as former embodiments, there is provided a stiffness reduced portion 8 on the door inner panel 5. A longitudinal groove 31 is formed on an upper horizontal surface 5a of the door inner panel 5, and a plurality of beads 32 are formed on a vertical surface 5b of the door inner panel 5 in the up-and-down direction so as to correspond to the side of the passenger. The groove 31 and each bead 32 are formed by deforming the door inner panel 5 which consists of the closed cross-section member with a belt line reinforcement 4 without protruding toward the compartment room as shown in FIG. 3(b). Therefore, this embodiment can provide the same effect as the previous embodiments.

Figure 4B:
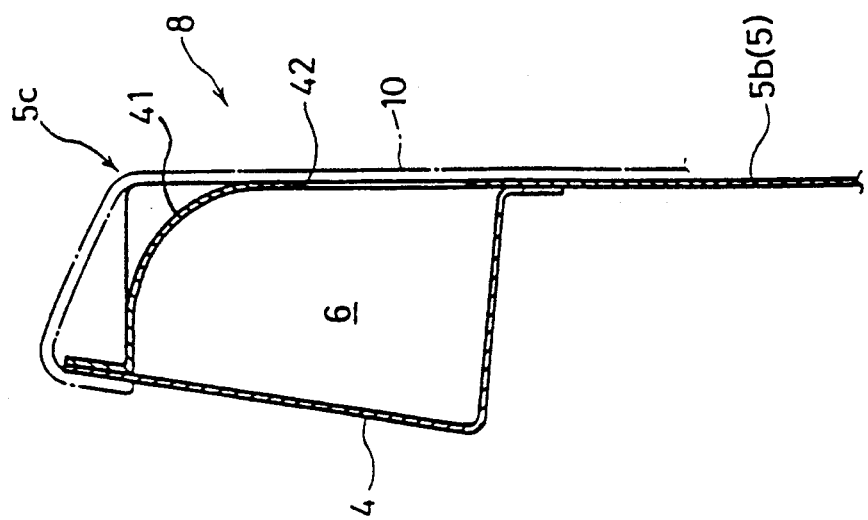
FIG. 4(b) is a cross-sectional view taken along a line D—D of FIG. 4(a)
Figure 4A:
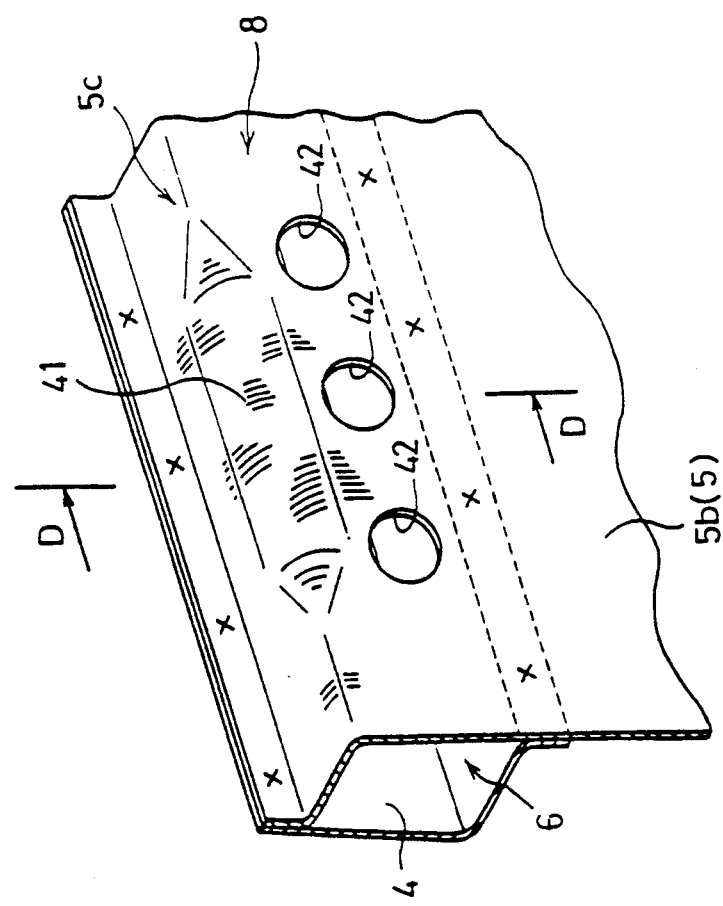
FIG. 4(a) is a perspective view showing main portions of a side body energy absorbing structure in accordance with yet another embodiment of the present invention.

Referring to FIGS. 4(a) and 4(b), the stiffness reduced portion 8 is provided on the door inner panel 5 as in the third embodiment. A round portion 41 is provided at the corner portion 5c of the door inner panel 5 at the portion corresponding to the side of the passenger. Also, on the vertical surface 5b, a plurality of holes 42 are provided below the round portion 41. The holes 42 communicate with the closed cross-section number 6 consists of the door inner panel 5 and the belt line reinforcement 4. The same effect as the previous embodiments can be obtained in this embodiment.

I claim:

1. A collision energy absorbing structure for a vehicle side body, comprising:
a closed cross-section member formed by a belt line reinforcement and a side door panel, wherein the closed cross-section member includes a stiffness reduced portion formed on a side of at least one of the belt line reinforcement and the side door panel facing toward a passenger seated in the vehicle and the stiffness reduced portion has a relatively lower stiffness than the remaining portion of the closed cross-section member.

2. A collision energy absorbing structure in accordance with claim 1 in which the stiffness reduced portion is concealed in a side door.

3. A collision energy absorbing structure in accordance with claim 2 which the stiffness reduced portion is concealed by a flat trim which does not protrude toward the passenger.

4. A collision energy absorbing structure in accordance with claim 1 in which the stiffness reduced portion is a concave portion on the closed cross-section member.

5. A collision energy absorbing structure in accordance with claim 4 in which the concave portion is formed on the belt line reinforcement, and the concave portion is spaced from a door inner panel by a predetermined gap without being welded to the door inner panel.

6. A collision energy absorbing structure in accordance with claim 5 in which the belt line reinforcement is connected to an upper edge of the door inner panel.

7. A collision energy absorbing structure in accordance with claim 1 in which the stiffness reduced portion is provided at a plurality of portions.

8. A collision energy absorbing structure in accordance with claim 7 in which the plurality of stiffness reduced portions is formed on the belt line reinforcement which is connected to a door inner panel covered with a flat trim.

9. A collision energy absorbing structure in accordance with claim 1 in which the stiffness reduced portion is provided at a portion corresponding to the side of a passenger who is seated on a rear seat.

10. A collision energy absorbing structure in accordance with claim 1 in which the stiffness reduced portion is a concave portion, and an energy absorber is fitted to the inside surface of the concave portion.

11. A collision energy absorbing structure in accordance with claim 1 in which the stiffness reduced portion is a longitudinal groove formed on an upper horizontal surface of an inner panel of the side door.

12. A collision energy absorbing structure in accordance with claim 1 in which the stiffness reduced portion is a plurality of beads formed on a vertical surface of an inner panel of the side door.

13. A collision energy absorbing structure in accordance with claim 1 in which the stiffness reduced portion is a round portion provided at a corner of an inner panel of the side door panel.

14. A collision energy absorbing structure in accordance with claim 13 in which the stiffness reduced portion further comprises a plurality of holes provided below the round portion.

15. A collision energy absorbing structure in accordance with claim 1, wherein the stiffness reduced portion is disposed on an inner side door panel.

16. A collision energy absorbing structure in accordance with claim 1, wherein the closed cross section member is disposed between a side glass window and the passenger.

17. A collision energy absorbing structure in accordance with claim 1, wherein the stiffness reduced portion further comprises a plurality of holes provided below the round portion.

18. A collision energy absorbing structure for a vehicle side body, comprising:
 a closed cross-section member formed by a belt line reinforcement and a side door panel, wherein the closed cross-section member includes a stiffness reduced portion formed on an inner side door panel facing toward a passenger seated in the vehicle and the stiffness reduced portion has a relatively lower stiffness than the remaining portion of the closed cross-section member.

19. A collision energy absorbing structure for a vehicle said body, comprising:
 a closed cross-section member formed by a belt line reinforcement and a side door panel, wherein the closed cross-section member includes a stiffness reduced portion formed on a round portion provided at a corner of an inner panel of the side door panel facing toward a passenger seated in the vehicle and the stiffness reduced portion has a relatively lower stiffness than the remaining portion of the closed cross-section member.

* * * * *